(12) United States Patent
Leijon et al.

(10) Patent No.: US 8,471,398 B2
(45) Date of Patent: Jun. 25, 2013

(54) WAVE POWER UNIT, AND A USE OF A SUCH

(75) Inventors: Mats Leijon, Uppsala (SE); Stefan Gustafsson, Uppsala (SE)

(73) Assignee: Seabased AB, Uppsala (SE)

( * ) Notice: Subject to any disclaimer, the term of this patent is extended or adjusted under 35 U.S.C. 154(b) by 317 days.

(21) Appl. No.: 13/061,391

(22) PCT Filed: Aug. 28, 2008

(86) PCT No.: PCT/SE2008/050975
§ 371 (c)(1),
(2), (4) Date: Feb. 28, 2011

(87) PCT Pub. No.: WO2010/024745
PCT Pub. Date: Mar. 4, 2010

(65) Prior Publication Data
US 2011/0193347 A1 Aug. 11, 2011

(51) Int. Cl.
*F03B 13/00* (2006.01)
(52) U.S. Cl.
USPC .................................................. 290/53; 384/7
(58) Field of Classification Search
USPC ............................................................ 290/53
See application file for complete search history.

(56) References Cited

U.S. PATENT DOCUMENTS

| 2,885,821 | A | * | 5/1959 | Frick ........................... 248/345.1 |
| 6,020,653 | A | * | 2/2000 | Woodbridge et al. ........... 290/53 |
| 6,343,993 | B1 | * | 2/2002 | Duval et al. .................... 464/167 |
| 6,474,868 | B2 | * | 11/2002 | Geyer et al. ...................... 384/49 |
| 7,032,704 | B2 | * | 4/2006 | Zernickel et al. ............. 180/444 |
| 7,141,888 | B2 |   | 11/2006 | Sabol et al. |
| 7,164,212 | B2 | * | 1/2007 | Leijon et al. .................... 290/42 |
| 7,323,790 | B2 |   | 1/2008 | Taylor et al. |
| 7,355,293 | B2 |   | 4/2008 | Bernhoff et al. |
| 7,405,489 | B2 |   | 7/2008 | Leijon et al. |
| 7,554,215 | B1 | * | 6/2009 | Caragine ........................ 290/42 |
| 8,220,258 | B2 | * | 7/2012 | Emigh ............................ 60/525 |
| 2004/0197037 | A1 | * | 10/2004 | Weissflog ....................... 384/52 |
| 2005/0237775 | A1 | * | 10/2005 | Sabol et al. .................. 363/178 |
| 2010/0281861 | A1 | * | 11/2010 | Emigh ............................ 60/525 |

FOREIGN PATENT DOCUMENTS

| DE | 102008041660 A1 | * | 3/2010 |
| EP | 1065397 A1 | * | 1/2001 |
| EP | 1070865 A2 | * | 1/2001 |
| GB | 2407438 A | * | 4/2005 |
| WO | WO 2011149398 A1 | * | 12/2011 |
| WO | WO 2011149399 A1 | * | 12/2011 |

* cited by examiner

*Primary Examiner* — Joseph Waks
(74) *Attorney, Agent, or Firm* — Dykema Gossett PLLC

(57) ABSTRACT

The invention relates to a wave-power unit for the production of electric power. It comprises a floating body arranged for floating on the sea and an electric linear generator with a stator (5) and a reciprocating translator (6). The stator (5) is arranged to be anchored in the bed of a sea and the translator (6) is connected to the floating body by connection means, The translator (6) is journalled in a plurality of roiling elements (15) such that a circumferential gap (14) is formed between the stator and the translator. According to the invention each rolling element (15) has an elasticity that is low enough to meet the condition that a change in the width (d) of the gap results in a change in the total force from the roiling elements (15) that is larger than the total magnet forces on the translator resulting from the change in width (d). The invention also relates to a use of the invented wave-power unit.

19 Claims, 4 Drawing Sheets

WAVE POWER UNIT, AND A USE OF A SUCH

FIELD OF INVENTION

The present invention in a first aspect relates to a wave-power unit for the production of electric power and comprising a floating body arranged for floating on the sea and an electric linear generator having a stator and translator reciprocating along a center axis, the stator being arranged to be anchored in the bed of a sea and the translator being connected to the floating body by connection means, which translator is journalled in a plurality of rolling elements such that a circumferential gap is formed between the stator and the translator.

In a second aspect the invention relates to a use of such a wave-power unit.

In the present application the terms "axial", "radial" and "circumferential" refer to the axes defined by the reciprocating movement of the centre of the translator if not explicitly stated otherwise. The terms "upper" and "lower" refer to the vertical direction and relates to the orientation of the components in question when the wave-power unit is in operation.

BACKGROUND OF THE INVENTION

Wave movements in the sea and in large inland lakes constitutes a potential source that have scarcely been exploited so far. However various suggestions have been made to use the vertical movements of the sea for producing electrical power in a generator. Since a point on the sea surface makes a reciprocating vertical movement it is suitable to use a linear generator to produce the electric power.

WO 2004/085842 discloses such a wave-power unit where the moving part of the generator, i.e. the part that corresponds to the rotor in a rotating generator and in the present application called translator, reciprocates in relation to the stator of the generator. In that disclosure the stator is anchored in the sea bed. The translator is by wire, cable or a chain connected to a body floating on the sea.

It is important that the guiding of linear motion of the translator in relation to the stator is exact and reliable so that the size of the gap between the translator and stator is retained at an exact value. The gap is in the size of 1-5 mm, preferably about 2 mm. Since a generator of the type in question may be fairly large, insufficient precision in the guiding entails that the size of the gap risks deviating substantially from the predetermined one. This entails asymmetry of the occurring magnetic forces, which results in harmful asymmetric forces on the translator with the risk of operational disturbances as well as breakdown. Also the electromagnetic transformation of energy is effected negatively by erroneous gap size.

Between the translator and the stator there are very strong magnetic attraction forces. In order to minimize the load on the bearings therefore the generator preferably is made symmetrical such that the magnet force across the gap on one side outbalances the magnet forces across the gap on an opposite side. The journaling force required thereby is ideally zero.

However when there occurs a slight deviation from the equilibrium the magnet forces on the side where the gap decreases will increase and on the opposite side where the gap increases the magnet forces will decrease. Thereby a resultant magnetic force will act to further move the translator towards the side where the gap is decreased.

The object of the present invention is to arrange the journaling of the translator such that the above described effect that occurs when the gap width changes is counter-acted in an effective way.

SUMMARY OF THE INVENTION

The object of the invention is achieved in that a wave-power unit of the kind initially specified includes the specific features that each rolling element has an elasticity that is low enough to meet the condition that a change in the width of the gap results in a change in the total force from the rolling elements on the translator that is larger than the total magnet forces on the translator resulting from said change in width.

The forces from the rolling elements thereby increase more rapidly than the magnet forces when the gap decreases. The tendency that the decrease of the gap width will accelerate due to the increasing magnet forces thereby is eliminated by the counter-acting forces from the rolling elements.

It is to be understood that the elasticity of the rolling element is the total journaling elasticity established in the cooperation between the rolling element and the tracks against which it rolls. If for example one or both of the tracks on which the rolling element rolls has a coating, the elasticity of that coating is included in the elasticity of the rolling element. Likewise is any elasticity in the mounting of the roiling element included.

According to a preferred embodiment the change in said total force from the rolling elements is in the range of 2 to 5 times as large as the change in said magnet forces.

Thereby the increase in the forces from the rolling elements is at least double the increase of the magnet forces, which provides a large reliability in the securing of a sufficient counter-acting force. The upper limit of the range means that the rolling elements will have a certain minimum elasticity. If these elements were almost completely rigid problems of other kind could occur due to the high precision in tolerances that would be required in order to avoid non-uniform pressure on the various rolling elements.

According to a further preferred embodiment each rolling element has a shaft mounted on the generator.

This is a mechanically advantageous arrangement that provides a well controlled cooperation between the rolling elements and the relatively moving parts.

According to a further preferred embodiment the shafts are mounted on the translator.

This simplifies to attain an adequate mounting of the rolling elements. If repair work has to be done regarding the journaling, e.g. exchange of rolling elements or adjusting the mounting thereof it is more convenient if they are mounted on the translator.

According to a further preferred embodiment each rolling element is preloaded.

This contributes to obtain a proper journaling of the translator in the neutral position and provides advantageous force conditions when gap width changes occur.

According to a further preferred embodiment the preloading force on each rolling element is in the range of 1 to 5 k.

For most applications a preloading force within this range will be an adequate balance between the need to have a sufficient preload and to avoid a too high squeezing of the rolling elements in the neutral position.

According to a further preferred embodiment each rolling element is a wheel with a hub made of metal and a roller bed made of plastic.

Thereby the elasticity of the roiling element is within the element itself, due to the plastic roller bed. Thus the rolling element does not need to be elastically mounted, which would cause large repair costs in case of bearing failure. Preferably the metal is iron or steel.

According to a further embodiment the rolling elements include a plurality of rolling elements that are circumferentially distributed such that the translator is journalled in two perpendicular directions.

This allows having the magnet poles circumferentially distributed at more than two sides of the translator thereby obtaining a higher number of electromagnetically energy transferring units.

According to a further preferred embodiment the translator has a main cross sectional shape perpendicular to the axis that is a polygon, whereby magnets are provided on each side of the polygon.

A large number of magnets thereby can be provided, and the outbalancing of the magnet forces in the neutral position of the translator is easy to obtain. The polygon shape also provides a well-defined journaling in all directions. Preferably the polygon is a regular polygon, which provides a high degree of symmetry leading to a smooth performance.

According to a further preferred embodiment the polygon is a quadrangle.

In many aspects this leads to a simple and reliable construction of the generator. Preferably the quadrangle is a square.

According to a further preferred embodiment the translator is arranged to reciprocate inside the stator, the rolling elements are located on the outside of the translator and are mounted at the corners of the polygon.

An internal arrangement of the translator is advantageous in many respects such as the protection against the environment, the journaling and the electric connections to the stator. By locating the rolling elements on the outside of the translator they can co-operate directly with the stator which secure a precise journaling. Mounting the rolling elements at the corners of the polygon results in the most stable journaling, and the sides of the polygon need not to be partly occupied by rolling elements but will be entirely free for the magnets.

According to an alternative preferred embodiment the translator has an axial through-hole, a rigid element extends through the through-hole and the rolling elements are located in the through-hole.

In some applications such an internal journaling leads to a higher precision and a less complicated structure, in particular when the cross-sectional shape of the translator derivates from a quadrangle. The through-hole is preferably boated in the center of the translator and the rigid element is preferably symmetrically located in relation to the through-hole. The rigid element might constitute the stator or be a beam rigidly connected to an externally located stator.

According to a further preferred embodiment the rolling elements include a plurality of rolling elements located in a common plane perpendicular to the axis.

The balancing of the mechanical and magnetic forces thereby is optimized.

According to a further preferred embodiment the rolling elements are located in a plurality of such planes where a plurality of rolling elements is located in each plane.

Having more than one such plane further secures the force balancing since the journaling takes place at a plurality of axial positions. Tilting tendencies of the translator thereby is eliminated in a simple way.

According to a further preferred embodiment the rolling elements include a plurality of axially distributed rolling elements.

Also with this embodiment the journaling takes place in different axial positions securing an axial alignment of the translator in relation to the stator.

According to a further preferred embodiment the axially distributed rolling elements include a plurality of axial rows of rolling elements, each row including a plurality of rolling elements.

Thereby a particularly well-defined journaling is achieved which in a simple way secures the relation between the translator and stator in all directions.

According to a further preferred embodiment the number of rows is eight, each row includes 4 to 6 rolling elements and the rolling elements are located in groups of eight in a respective plane perpendicular to the axis.

This means that the rolling elements will be located in a matrix axially and circumferentially. The large number of rolling elements in each row and in each plane provides a high spread of the mechanical forces such that each rolling element only carries a small part of the total load. This contributes to a smooth and reliable performance. Normally 6 to 10 rolling elements in each row is appropriate.

According to a further preferred embodiment the number of elements is larger than the number of poles in the generator.

Also with this embodiment a high spread of the mechanical forces is obtained.

The invention also relates to an electric network connected to at least one wave-power unit according to the present invention.

According to the second aspect of the invention a wave-power unit according to the invention and in particular to any of the preferred embodiments thereof is used for generating electric energy for supply to an electric network.

The invented use has advantages corresponding to those of the invented wave-power unit and the preferred embodiments thereof, which advantages have been described above.

The invention will be further described by the following detailed description of examples thereof with reference to the accompanying drawings.

DESCRIPTION OF EXAMPLES OF THE INVENTION

Figure 1:
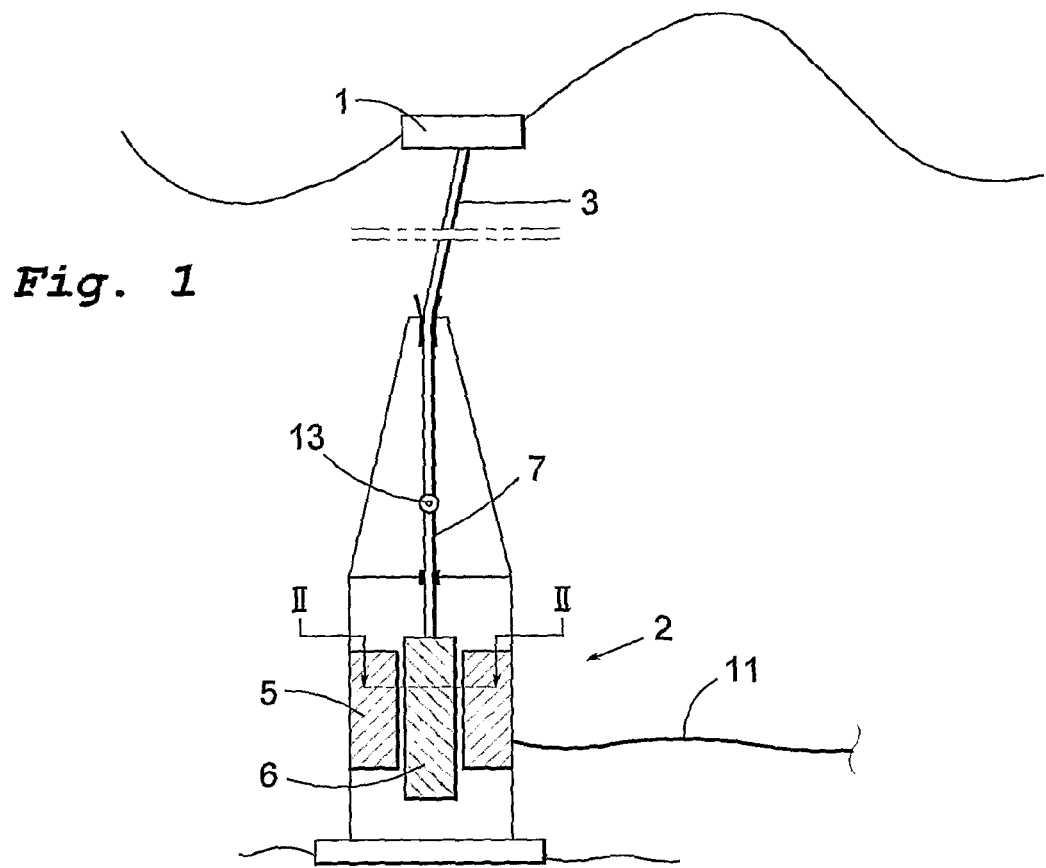
FIG. 1 is a schematic section through a wave-power unit according to the invention.

FIG. 1 is a schematically side view of a wave-power unit according to the invention in operation in the sea. A floating body 1 floats on the sea surface and is connected by a connection means 3, 7, to a linear generator 2 anchored at the sea bed. The connection means consists of an upper part 3, which is a wire, rope, chain or the like and a lower part 7 which is a rigid rod. The wire 3 is connected to the rod 7 by a joint 13. In the figure the generator is attached at the sea bed. It is, however, to be understood that the generator can be located above the sea bed and be anchored in some other way.

The linear generator 2 has a stator 5 with windings and a translator 6 with magnets. The translator 6 is able to reciprocate up and down within the stator 5 thereby generating current in the stator windings, which current by an electric cable 11 is transferred to an electric network.

When the floating body 1 due to the wave movements of the sea surface is forced to move up, the floating body will pull the translator 6 down upwards. When the floating body thereafter moves down the translator 6 will move down through gravity.

Optionally but preferably a spring (not shown) or the like acting on the translator 6 provides an additional force downwards.

Figure 2:
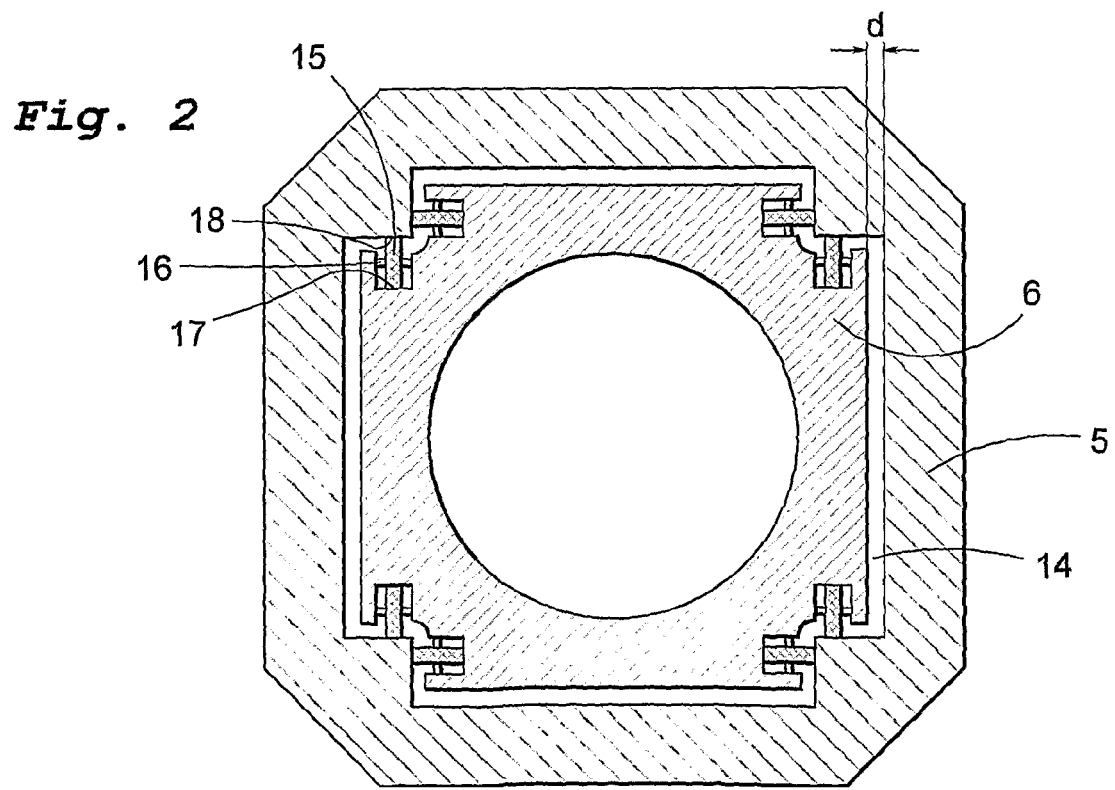
FIG. 2 is a section along line II-II in FIG. 1.

FIG. 2 is a section along line II-II in FIG. 1 and illustrates the journaling of the translator 6 in the stator 5. In the shown example the translator 6 has a square-shaped cross section. Magnets are provided on all four sides of the square. Each side of the translator 6 forms a gap 14 with the stator. In the neutral position the gap width d is the same on two opposite sides, and preferably the same on all four sides. To maintain the neutral position as far as possible the translator 6 is journalled in a number of rolling elements 15, in the disclosed example in the form of wheels. Eight such wheels are provided in a single cross sectional plane. Two wheels 15 are arranged at each corner of the translator.

The two wheels 15 at each corner are rotateably mounted on a respective shaft 16 supported by the translator and the shafts are perpendicular to each other. Each wheel 15 rolls against a track 17 on the translator 6 and a track 18 on the stator. Each wheel has a certain elasticity and is somewhat compressed in order to obtain a preloading force in the neutral position of the translator.

Figure 3:
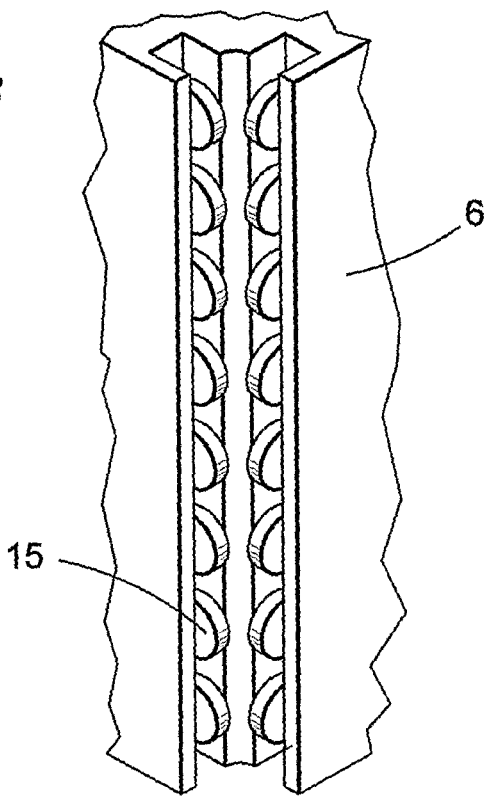
FIG. 3 is a simplified perspective view of one corner of the translator in FIG. 2.

In FIG. 3 the arrangement of the wheels is illustrated in a perspective view towards the left bottom corner of the translator in FIG. 2. In the longitudinal direction the wheels 15 are arranged in eight rows (two at each corner). In the illustrated example the number of wheels in each row is eight, making a total of 64 wheels.

Figure 4:
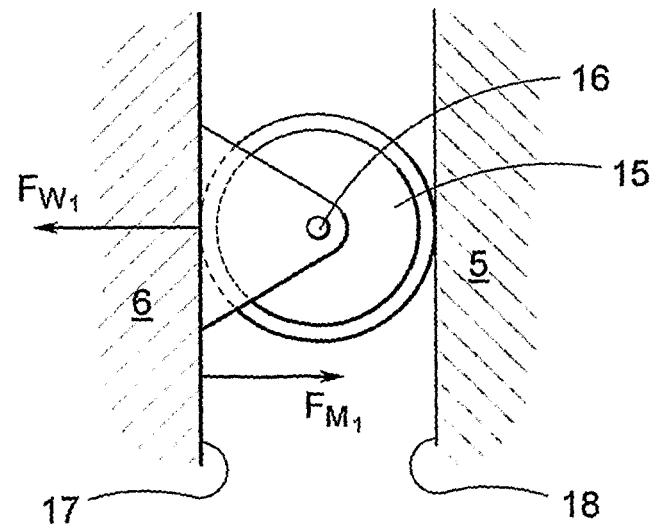
FIG. 4 is a simplified section through one of the rolling elements of the translator in FIG. 3.

FIG. 4 illustrates one of the wheels 15 arranged between the track 18 of the stator 5 and the track 17 on the translator. $F_{W_1}$ represents the sum of all forces from the wheels on this side of the translator and $F_{M_1}$ represents the sum of all magnet forces across the gap on this side.

When the translator is in its neutral position the magnet forces on one side are outbalanced by the magnet forces on the opposite side so that the resultant magnet force on the translator is zero. In that position also the preloading force from the wheels outbalance each other.

If the position of the translator is changed from the neutral position such that the gap increases on one side and decreases on the other side the resultant magnet force will no longer be zero. Within a limited range, i.e. less than 1 mm change in gap width the magnet force increases approximately linear with decreasing gap width.

LIST OF SYMBOLS USED IN THE FOLLOWING

X=decrease of a gap from neutral position
$F_M$=resultant of all magnetic forces across to opposite gaps
$F_{M_1}$=sum of all magnetic forces across the gap on the first side
$F_{M_2}$=sum of all magnetic forces across the gap on the opposite side
$F_{M_0}$=sum of all magnetic forces across a gap in the neutral position
$K_M$=constant related to the total magnetic force
$F_W$=resultant of all wheel forces from two opposite sides
$F_{W_1}$=sum of all wheel forces on the first side
$F_{W_2}$=sum of all wheel forces on the opposite side
$F_S$=sum of all preloading forces from the wheels on one side
$K_W$=spring constant of all the wheels on one side
$f_m$=resultant magnetic force from one pair of opposite poles
$f_{m_1}$=magnetic force from one pole across the gap on the first side
$f_{m_2}$=magnetic force from one pole across the gap on the opposite side
$f_{m_0}$=magnetic force from one pole across a gap in the neutral position
$k_m$ constant related to the magnetic force of one pole
$f_w$=resultant force from two opposite wheels
$f_{w_1}$=force from one wheel on the first side
$f_{w_2}$=force from one wheel on the opposite side
$f_s$=preloading force from one wheel
$k_w$=spring constant of one wheel
m=number of poles on one side
n=number of poles on one side If the total magnet force across a gap in the neutral position is $F_{M_0}$, the force across a gap that has been decreased X mm from the neutral position will be $F_{M_1}=F_{M_0}(1+K_MX)$, and an the opposite side the magnet force will be $F_{M_2}=F_{M_0}(1-K_MX)$ The resultant magnetic force will be $F_M=F_{M_1}-F_{M_2}=F_{M_0}2K_MX$, which acts in the direction of the decreased gap.

This force is counteracted by the forces from the wheels. The total forces $F_{W_1}$ from the wheels on one side of the translator in the neutral position is $F_S$, where $F_S$ is the total preloading force on that side. A corresponding preloading force acts on the opposite side such that the resultant force from the wheels in the to neutral position is zero.

If the position of the translator is changed from the neutral position the force from the wheels on one side increases and the force from the other side decreases. The change of the total force from the wheels on one side of the translator is likewise a linear function of the change of the gap width within a limited range. The force from the wheels on the side where the gap decreases will be $F_{W_1}=F_S+K_WX$ and on the opposite side $F_{W_2}=F_S-K_WX$. The resultant force from the wheels on the translator thus will be $F_W=2K_WX$. This is valid only when $F_S>K_WX$. If $F_S$ is smaller than that, the resultant force from the wheels will be $F_W=F_S+K_WX$ The condition prescribed according to the present invention implies that $F_W>F_M$. Thus $2K_WX>2F_{M_0}K_MX$ or $K_W>F_{M_0}K_M$ To have a secure margin against that the magnet forces will override the wheel forces it is preferred that $K_W>2F_{M_0}K_M$ The force conditions are shown in FIGS. 5 to 7 for a certain example.

Figure 5:
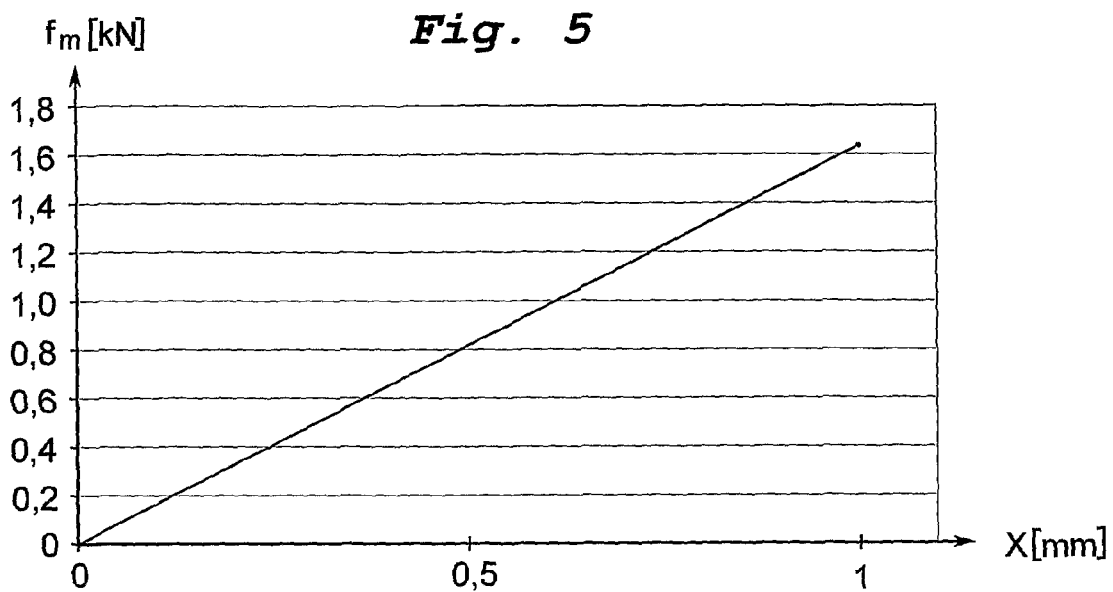
FIG. 5 is a diagram showing the resultant magnet force from one pole as a function of change in gap width.

In FIG. 5 the resultant magnetic force $f_m$ for the two opposite sides of one pole is given as a function of the deviation from the neutral position $f_m=2k_{m_0}X$, where $2f_{m_0}k_m=1.64$ kN/mm: $f_m$ is calculated in kN and X in mm.

The total magnet force from n poles thus will be $F_M=1.64$ n X kN in this example.

Figure 6:
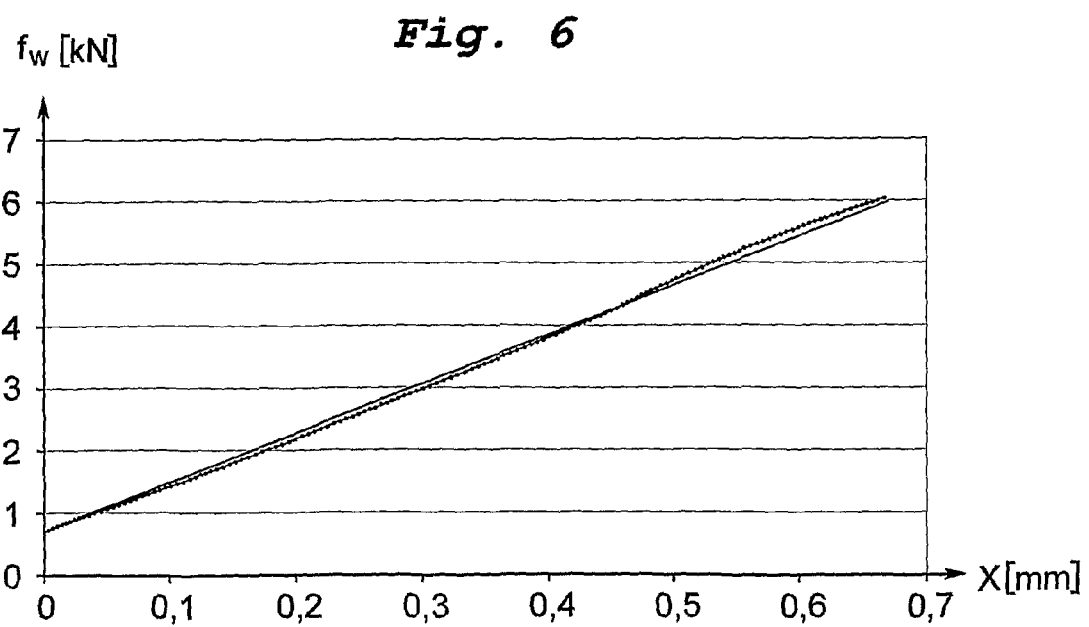
FIG. 6 is a diagram showing the wheel force as a function of change in gap width.
Figure 7:
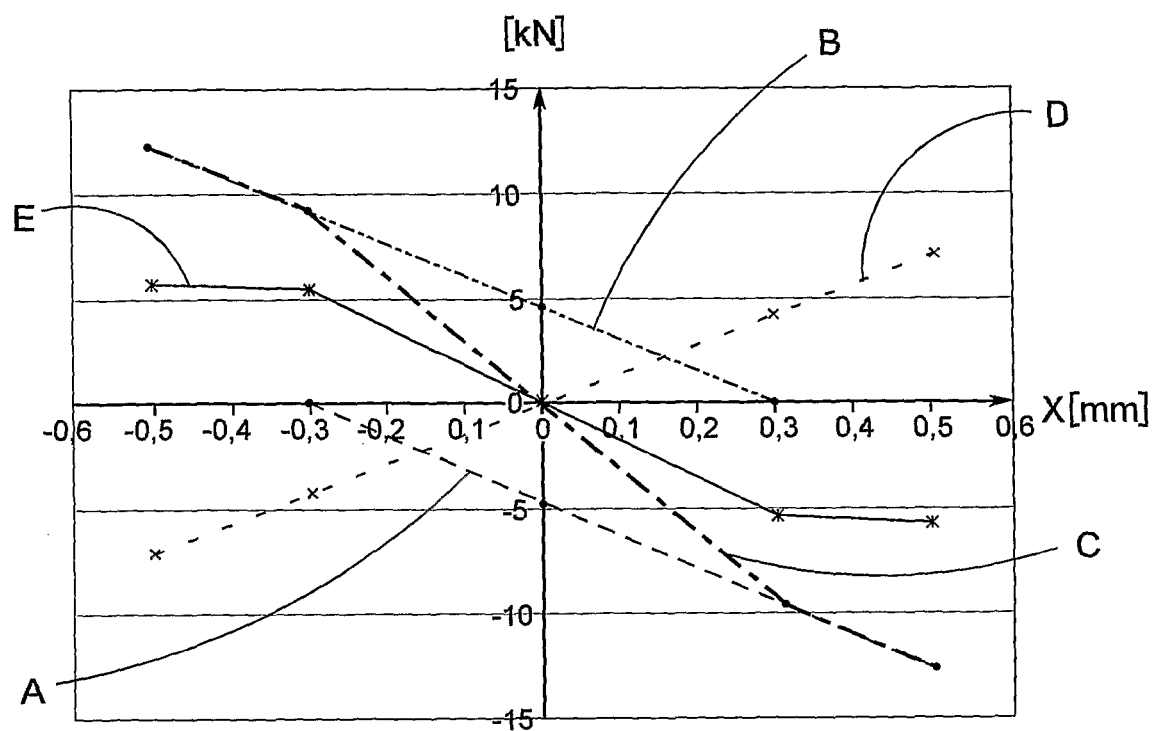
FIG. 7 is a diagram showing the various forces acting on the translator as a function of change in gap width.

In FIG. 6 the elasticity of a wheel is illustrated where the spring force from a wheel is given as a function of the deviation from the neutral position.
$f_{w_1}=f_s+k_wX$, where $f_s=0.66$ kN and $k_w=7.8$ kN/mm. A wheel on the opposite side acts with a spring force in the opposite direction which is $f_{w_2}=f_s\ldots k_wX$ so that the sum of the forces from the two opposite wheels will be $f_w=2k_wX=15.6$ X kN. With m wheels the total force from the wheels will be: $F_w=15.6$ m X kN.

Applying the condition that $F_w$ should be $2F_m$ as a minimum will result in 15.6 m X=2·1.64 nX which gives that the number of wheels on one side is:

$$m = \frac{2 \cdot 1.64}{15.6} n = 0.21n.$$

In this example the translator has 33 poles which leads to a requirement of 0.21·33=7 wheels on each side. Due to symmetry reasons the wheels are arranged in pairs on each side which means that four pair of wheels is required on each side in this example, resulting in a total of 32 wheels on the translator.

The example is further illustrated in the graph of FIG. 7, where the forces in kN are given as a function of change in the gap width, where A is the force from a pair of wheels on one side, B is the force from the opposite pair of wheels, C is the sum of A and B, D is the resultant force from one pole and F is the sum of C and D.

The wheels used in the above example have a diameter of 150 mm and a thickness of 30 mm. They are made of cast iron having a roller bed made of polyurethane. Each wheel should be able to maintain rolling with a tolerance of ±0.25 mm without overloading the wheel bearing and be designed for $10^8$ translator cycles. A wheel used in the example operate with a force of 5 kN for 130 millions of turns at a speed of 1 m/s with 90% reliability and for 48 millions of turns with 99% reliability.

Figure 8:
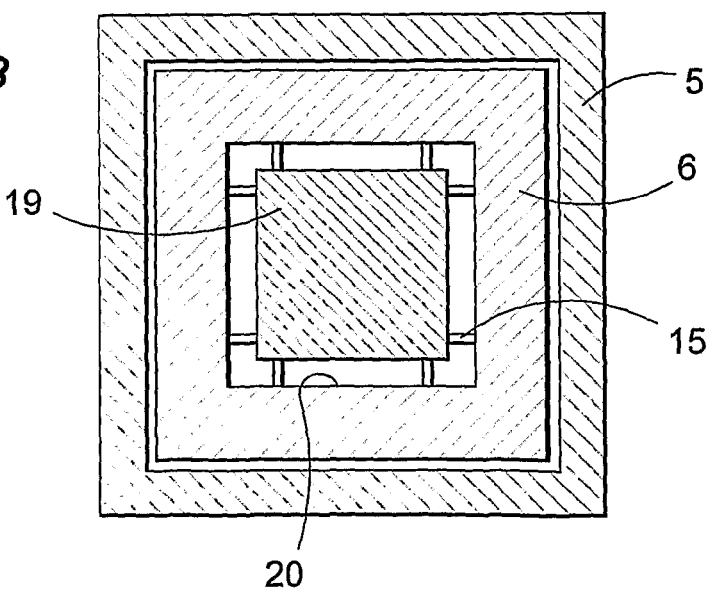
FIG. 8 is a section similar to that of FIG. 2 but illustrating an alternative example.

FIG. 8 in a section perpendicular to the axial direction schematically illustrates an alternative example, where the translator 6 is internally journalled. The translator 6 has an axial through-hole 20 in which a rigid element 19 extends. The rolling elements 15 operate between the translator 6 and the rigid element 19 to maintain a uniform gap-width between the translator 6 and the stator 5 as described above. The rigid element 19 is rigidly connected to the stator 5. It is to be understood that the shape of the through-hole 20 does not necessarily need to correspond to the external shape of the translator 6 as in the case in the figure.

The invention claimed is:

1. A wave-power unit for the production of electric power and comprising a floating body arranged for floating on the sea and an electric linear generator having a stator and translator reciprocating along a center axis, the stator being arranged to be anchored in the bed of a sea and the translator being connected to the floating body by connection means, which translator is journalled in a plurality of rolling elements such that a circumferential gap is formed between the stator and the translator, wherein each rolling element has an elasticity that is low enough to meet the condition that a change in the width of the gap results in a change in the total force from the rolling elements the translator that is larger than the total magnet forces on the translator resulting from said change in width.

2. The wave-power unit according to claim 1, wherein the change in said total force from the rolling elements is in the range of 2 to 5 times as large as the change in said total magnet forces.

3. The wave-power unit according to claim 1, wherein each rolling element has a shaft mounted on the generator.

4. The wave-power unit according to claim 3, wherein the shafts are mounted on the translator.

5. The wave-power unit according to claim 1, wherein each rolling element is preloaded.

6. The wave power unit according to claim 5, wherein the preloading force on each rolling element is in the range of 1 to 5 kN.

7. The wave-power unit according to claim 1, wherein each rolling element is a wheel with a hub made of metal and a roller bed made of plastic.

8. The wave-power unit according to claim 1, wherein the rolling elements include a plurality of rolling elements that are circumferentially distributed such that the translator is journalled in two perpendicular directions.

9. The wave-power unit according to claim 1, wherein the translator has a main cross sectional shape perpendicular to the axis that is a polygon, preferably a regular polygon, whereby magnets are provided on each side of the polygon.

10. The wave power unit according to claim 9, wherein the polygon is a quadrangle, preferably a square.

11. The wave-power unit according to claim 9, wherein the translator is arranged to reciprocate inside the stator, the rolling elements are located on the outside of the translator and are mounted at the corners of the polygon.

12. The wave-power unit according to claim 9, wherein the translator has an axial through-hole, in that a rigid element extends through the through-hole, and in that the rolling elements are located in said through-hole.

13. The wave-power unit according to claim 1, wherein the rolling elements include a plurality of rolling elements located in a common plane perpendicular to the axis.

14. The wave-power unit according to claim 13, wherein the rolling elements are located in a plurality of such planes where a plurality of rolling elements are located in each plane.

15. The wave-power unit according to claim 1, wherein the rolling elements include a plurality of axially distributed rolling elements.

16. The wave-power unit according to claim 15, wherein the axially distributed rolling elements include a plurality of axial rows of roiling elements, each row including a plurality of rolling elements.

17. The wave-power unit according to claim 16, wherein the number of rows is eight, that each row includes 4 to 16 rolling elements, preferably 6 to 10 rolling elements, and wherein the rolling elements are located in groups of eight in a respective plane perpendicular to the axis.

18. The wave-power unit according to claim 1, wherein the number of rolling elements is larger than the number of poles in the generator.

19. An electric network wherein the network is connected to at least one wave-power unit according to claim 1.

* * * * *